United States Patent [19]

Miller

[11] Patent Number: 4,486,971

[45] Date of Patent: Dec. 11, 1984

[54] TROT LINE DISPENSER

[76] Inventor: Lynn D. Miller, 8992 Hanover Hill Rd., Hanover, Ill. 61041

[21] Appl. No.: 532,875

[22] Filed: Sep. 16, 1983

[51] Int. Cl.$^3$ ............................................. A01K 97/00
[52] U.S. Cl. ..................................... 43/57.3; 206/490; 206/503; 206/509
[58] Field of Search ...................... 43/57.3, 57.2, 57.1, 43/56, 54.1; 206/503, 509, 490; 224/920

[56] References Cited

U.S. PATENT DOCUMENTS

| | | | |
|---|---|---|---|
| 1,762,558 | 6/1930 | Mitchell | 206/490 |
| 3,005,281 | 10/1961 | Reitzammer | 43/57.3 |
| 3,009,569 | 11/1961 | Blair | 206/503 |
| 3,660,924 | 5/1972 | McGee | 43/57.3 |
| 3,991,507 | 11/1976 | Bart | 43/54.1 |

Primary Examiner—Nicholas P. Godici
Assistant Examiner—M. Jordan
Attorney, Agent, or Firm—Henderson & Sturm

[57] ABSTRACT

A trot line dispenser of inverted-truncated-cone configuration, having a flat bottom and an annular wall sloping upwardly and outwardly from the bottom to an upper annular rim provided with slots for temporarily retaining the short or hook lines prior to and during dispensing. The slots are so fashioned as to taper downwardly and outwardly in the rim from zero depth near the interior surface of the receptacle wall to maximum depth at the outer marginal edge of the rim, being so designed as to prevent the snagging of line during dispensing. The receptacle is provided with angularly spaced exterior radial wings that effectively increase the diameter of the bottom and thus stabilize the receptacle against tipping during transport. The interior of the receptacle is provided with matching slots to receive the wings of a like, stacked dispenser.

7 Claims, 6 Drawing Figures

U.S. Patent  Dec. 11, 1984  4,486,971
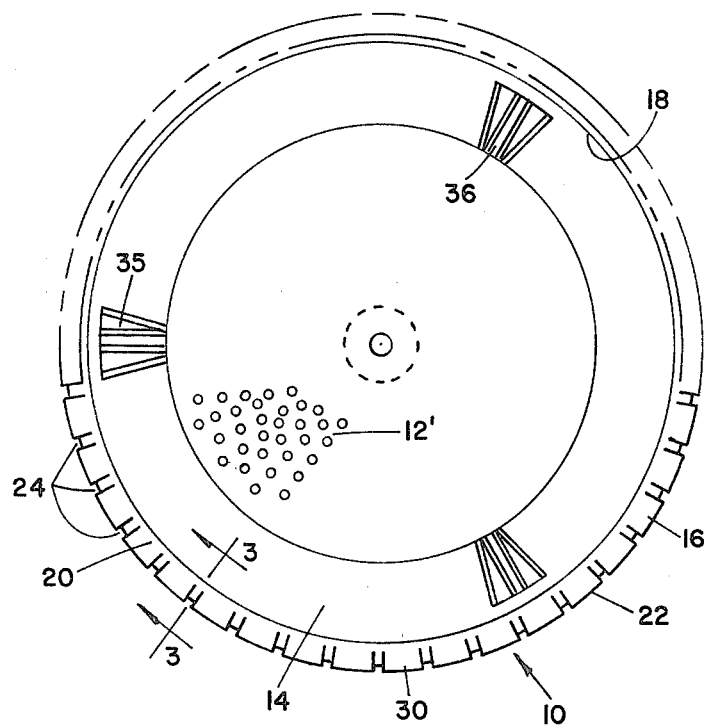
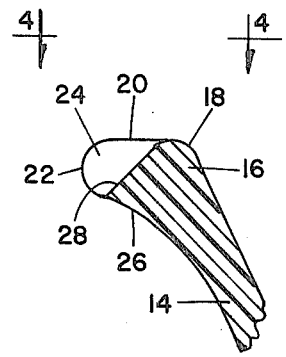
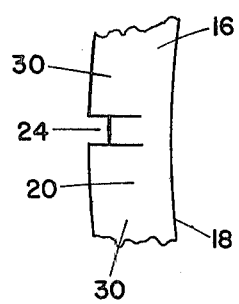
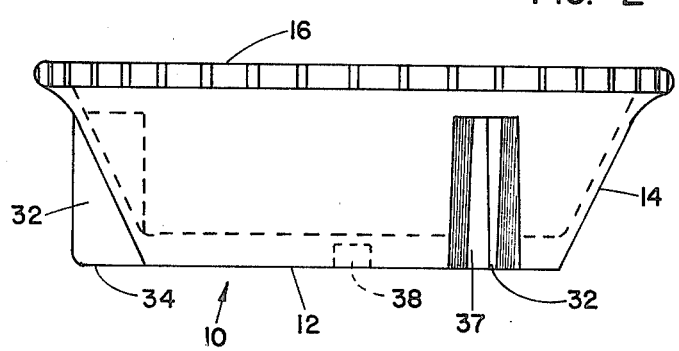
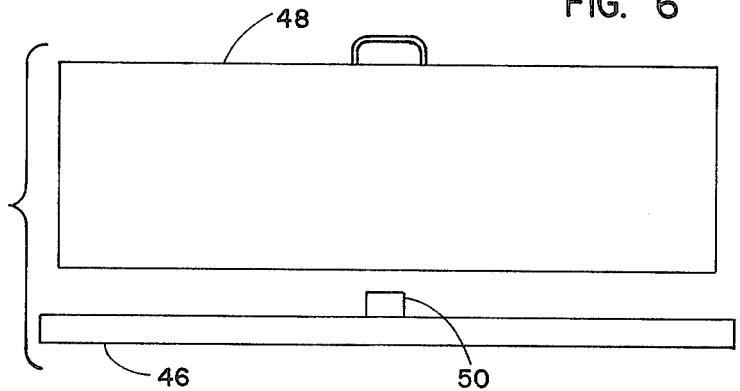
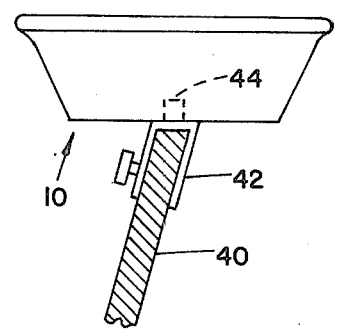

TROT LINE DISPENSER

BACKGROUND AND SUMMARY OF THE INVENTION

Trot line fishing is an art of long standing, and many devices have been developed to facilitate its accomplishment. One such device is the dispenser, usually some form of container, the container being formed with a wall or the like having an edge portion provided with a plurality of spaced apart, upwardly-opening slots for receiving the short or hook lines. One example of the container type dispenser is the subject of the Reitzammer U.S. Pat. No. 3,005,281. The dispenser there is of two-piece construction, having a square base with upstanding, slotted side walls and a square cover having matching slots. That container must be inverted in use, the top (which becomes the bottom when inverted) having pivot means for allowing the box-contained line to be played out as the boat moves away from some convenient anchor point, a procedure known in the art.

The deficiencies in a device such as Reitzammer's can be best recognized by brief reference to the basic purpose of a trot line dispenser, which is to enable setting of the line as quickly as possible, which in turn flows from the ability to bait hooks in a convenient place, set them out and pick them up later. In Reitzammer, the swivel for making the container rotatable is inside the container and thus apt to snag the line carried within the container. Next, the design uses a cover while dispensing and thus requires an extra step in use and operation. The slotted walls provide further snagging problems, both in setting out and picking up the line.

According to the present invention, these and other problems are eliminated by a design that enables fast and smooth operation, with no line snagging or other hang-ups. The pivot for rotation of the dispenser is exterior of the container and cannot interfere with the interior-carried line. The container has a flat circular bottom with an upwardly and outwardly sloping annular wall terminating in an upper circular rim of special design in which angularly spaced apart radial slots are provided. Each slot has its maximum depth at the outer marginal edge of the rim and the bottom of each slot tapers upwardly and inwardly to substantially zero depth adjacent to the smooth annular junction of the upper surface of the rim with the interior surface of the sloping annular wall, preferably terminating short of that interior wall so as to eliminate any possibility of line snagging during dispensing.

A further feature of the inventive dispenser is the provision of means for stabilizing the container against tipping during transport. The interior of the dispenser is configured to receive the stabilizing means of a like second container when stacked atop the first container. The sloping wall further adds to the ability of the containers to be stacked, both for transport and storage.

Further features and advantages of the invention will become apparent as a preferred embodiment of the invention is disclosed herein.

DESCRIPTION OF THE DRAWINGS

FIG. 1 is a top plan view of the dispenser.
FIG. 2 is a side view of same.
FIG. 3 is an enlarged section as seen along the line 3—3 of FIG. 1.
FIG. 4 is a plan of FIG. 3.
FIG. 5 is a reduced-scale view showing the dispenser mounted on the transom of a boat.
FIG. 6 is an "exploded" view of a carrying case.

DETAILED DESCRIPTION OF A PREFERRED EMBODIMENT

The inventive dispenser comprises essentially a bowl-like receptacle or container designated in its entirety by the numeral (10) and preferably formed of any of the moldable well-known/plastic materials possessing, among other things, such characteristics as low cost, high strength, resistance to cracking, corrosion, etc. The receptacle has a flat circular bottom (12) and an annular wall (14) integral with and sloping upwardly and outwardly from the bottom to an upper circular rim or lip (16), giving the receptacle the general shape of an inverted truncated cone. The inner portion of the rim joins the interior surface of the sloping wall at a smooth annular junction (18). The rim has an upper substantially flat upper surface (20) which extends radially outwardly away from the annular junction (18) to an outer circular marginal edge (22). Representative dimensions of a preferred dispenser provide for an outer diameter on the order of fourteen and one-half inches at the rim and nine and one-half inches at the bottom and a height of approximately four and one-half inches. It should be understood that these dimensions may be varied and are given here as exemplary and not limiting.

The upper surface of the rim is formed with a plurality (here sixty by way of example) of upwardly opening radially extending slots or grooves (24) spaced equiangularly about the rim. These slots have a special configuration designed to prevent or at least minimize snagging of the line as it is payed out during setting of the line, it being understood that the main line lies coiled within the receptacle and the hooks, via the usual short lines, dangle outwardly from the lip, being spaced apart on the main line, along with floats, weights, etc. The main and short lines, hooks, etc., are not shown because familiarity therewith is assumed. It is at this point that the significance of the sloping wall will be noted, because the dangling, baited hooks cannot readily swing into contact with and possibly to the outer surface of the wall, thus avoiding the chance that the hooks would pull out of the bait.

The rim has a radial thickness greater than that of the sloping wall (FIG. 3) and is in the form of a flange having an annular undersurface (26). Each slot has a bottom (28) that slopes downwardly from about the annular junction (18) to a radially outer part of the rim undersurface, opening radially outwardly at the outer marginal edge of the rim. Thus, the slot has its maximum depth at the outer marginal edge and the depth diminishes to zero substantially at the annular junction. It will be noted that no slot opens directly to the interior surface of the annular sloping wall (14). Thus, any knots, etc., in the line must, when the line is being drawn out from the receptacle, pass over the junction zone (18) and will ride on smooth rim surface portions (30) that border and intervene between the slots, eliminating snagging and the like. In the preferred embodiment, the slots are dimensioned relative to the short or hook lines so as to frictionally hold those lines, whereby the exteriorly disposed hooks may be held rather close to the rim rather than being allowed to dangle and become tangled with each other. The ability of the lines and knots, etc., thereon, to ride up and out of the receptacle is enhanced by the smooth outwardly and upwardly sloping annular wall (14) so that as portions of the line are uncoiled they ride uphill and away from portions still within the receptacle.

Another feature of the invention is that the bottom is perforated at 12' to provide at least one drain opening to enable draining water from the container, which is useful from the standpoint of disposing of water that has wet the line during the fishing operation. In most instances, the wet line will be slimy and will tend to stick to itself unless properly drained and dried and subsequently rinsed before the next use. The holes in the bottom are small enough so that they cannot cause snagging of the line, knots or swivels.

Another feature of the invention is that several like dispensers may be stacked atop each other, made possible by the sloping annular wall. Stacking is important from the standpoints of shipping, transport and storage. Still another feature is the provision of means for stabilizing the dispenser against tipping, as when resting on a flat surface. This means here takes the form of a plurality of radial wings (32) integral with and projecting from the exterior of the wall (14). As seen in FIG. 2, each wing has a bottom edge (34) coplanar with the underside of the receptacle bottom and in effect increases the effective base of the bottom. These wings are, of course, molded into the receptacle and the wings are hollow to form slots (36) for receiving the wings of a like dispenser during stacking. Each wing results from the formation by molding into the side walls of wedge-shaped interior projections (35) (here three in number) slotted at (36) to receive the wings which are formed exteriorly as median parts of wedgeshaped pockets (37). In stacking the receptacles, the wings respectively enter the slots and the pockets receive the interior wedges. The design is such that the bottom of an upper receptacle does not rest on the bottom of its next lower neighbor, thus leaving room for floats, etc., achieved here by spacing the tops of the interior wedges below the receptacle rim and correspondingly dimensioning the exterior pockets and wings so that a downward stop is provided. Any other form of interfit can be used.

The bottom (12) of the receptacle is formed with a central socket (38), preferably not extending into the interior of the receptacle. For the pivotal mounting of the receptacle on a boat, as via a transom (40), a suitable clamp (42) may be provided, having a pintle (44) received in the bottom socket (38) (FIG. 5). The clamp pintle is so angled that it is vertical, thus pivoting the receptacle on a vertical axis for easy dispensing and taking in of the line.

If desired, the receptacle, empty or baited, etc., may be carried in a carrying case comprising a bottom (46) and cover (48) (FIG. 6). The bottom has a central peg (50) for receiving the socket (38) of the dispenser and serves the purpose of preventing the dispenser from being laterally displaced during carrying. The case may be otherwise dimensioned to carry the receptacle snugly therein. Any suitable means, not shown, may be used to interconnect the top and bottom.

As stated previously, the foregoing disclosure is based on a preferred embodiment of the invention. Nevertheless, many modifications and additions may be made in the embodiment, all without departure from the spirit and scope of the invention.

I claim:

1. A trot line dispenser, comprising a bowl-like receptacle having a circular bottom and an annular wall joined to and sloping upwardly and outwardly from the bottom and terminating in an upper circular rim integral with the wall, said rim joining the interior surface of the annular wall at a smooth annular junction and having an upper surface extending radially outwardly from said junction and bordered by an outer, circular marginal edge, said rim further having uniformly angularly spaced thereabout a plurality of radial slots opening at said rim surface and at said outer marginal edge, each slot being of maximum depth at said outer marginal edge and diminishing in depth to substantially zero substantially at the annular junction of the rim with the inner surface of the annular wall, the surface portions among the slots being smooth to enable free passage of lines from the interior of the receptacle outwardly over the rim without snagging.

2. The dispenser of claim 1, in which the rim is of greater radial dimension that the annular wall thickness and the slots are radially elongated substantially in accordance with the radial dimension of the rim.

3. The dispenser of claim 1, in which the rim is in the form of an annular flange having an annular under portion spaced below the upper surface and each slot slopes downwardly and outwardly from the upper surface adjacent the annular junction and terminates at said under portion.

4. The dispenser of claim 3, in which the inner end of each slots terminates short of the interior surface of the annular wall.

5. The dispenser of claim 1, including a plurality of exterior, angularly spaced radial wings integral with the outer surface of the annular wall and having bottom portions substantially in the radial plane of the bottom to serve as means for stabilizing the receptacle against tipping.

6. The dispenser of claim 5, in which the interior of the receptacle has slot means disposed radially and spaced angularly according to the wings for receiving the wings of a second like dispenser stacked atop the first-named dispenser.

7. The container of claim 1, further characterized in that the bottom has at least one drain opening to enable the draining of water from the container.

* * * * *